June 27, 1972  W. L. PRIMAK  3,672,772
AUTOMATIC PHOTOELASTIMETER

Filed Aug. 31, 1970  3 Sheets-Sheet 1

Inventor
William L. Primak
Attorney

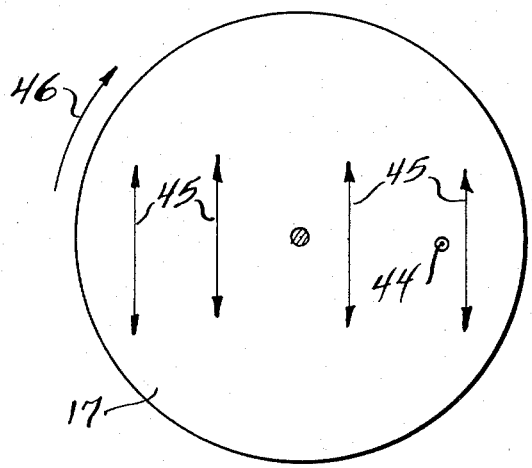
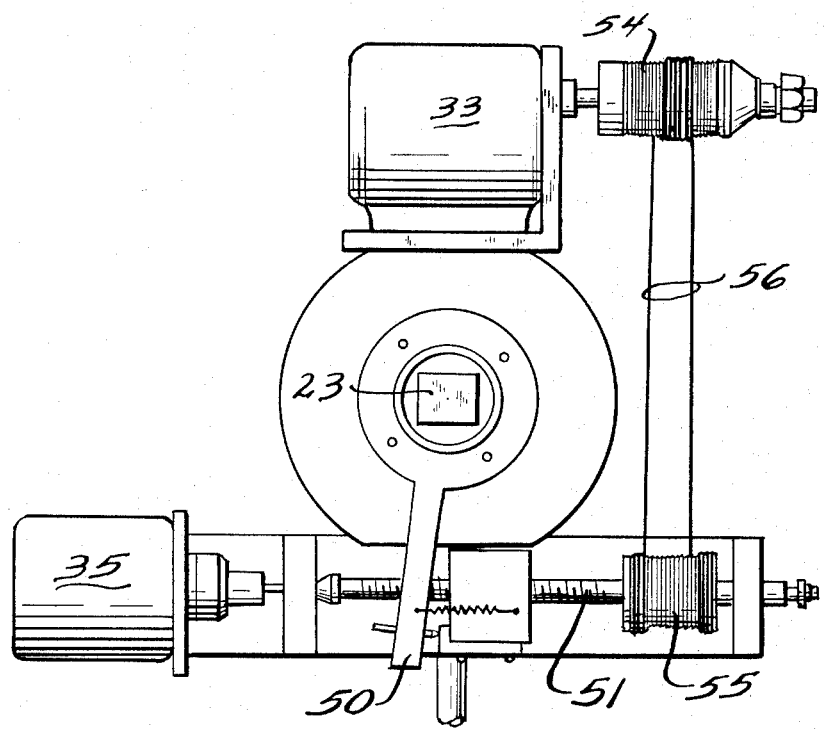

Inventor
William L. Primak
Attorney

United States Patent Office 3,672,772
Patented June 27, 1972

3,672,772
AUTOMATIC PHOTOELASTIMETER
William L. Primak, Hinsdale, Ill., assignor to the United States of America as represented by the United States Atomic Energy Commission
Filed Aug. 31, 1970, Ser. No. 68,089
Int. Cl. G01b 11/18
U.S. Cl. 356—33                                      7 Claims

ABSTRACT OF THE DISCLOSURE

An automatic photoelastimeter includes a rotating birefringent disk positioned to develop modulation of the ellipticity of the polarized light beam used in the photoelastimeter. The detected light beam develops an A.C. signal which is used to drive a servo system. The servo system adjusts the compensator to cancel the ellipticity caused by birefringence of the sample being examined. A second rotating birefringent disk may also be used to produce additional modulation to improve the action of the servo system by sweeping the dead space of the servo system.

CONTRACTUAL ORIGIN OF THE INVENTION

The invention described herein was made in the course of, or under, a contract with the United States Atomic Energy Commission.

BACKGROUND OF THE INVENTION

Photoelastic measurements of strain in transparent specimens of isotropic or cubic symmetry have been employed to determine induced dilatation. The technique has been most useful in the studies of radiation effects in solids, but it has been applied to other problems. The measurement required is the determination of relative retardations on traversing a specimen. When measurements are greater than several degrees rotation of the analyzer of a de Senarmont compensator, they can be made rapidly by visual inspection, particularly when the analyzer setting and the specimen positions are read by devices actuating an x–y recorder. However, when very small retardations are of interest, a more sensitive detector for extinction is necessary and adjustment of the analyzer becomes tedious and time-consuming.

Very small retardation measurements have been made by automatic equipment to minimize the operation time required. In one method the analyzer is driven to a point away from extinction to a point where the light intensity passing the analyzer has a particular value. This is an undesirable procedure because transmission and scattering often vary over the traverse of a specimen, and thus the results are inaccurate. It is therefore necessary to drive an analyzer to the extinction point in order to obtain accurate results. However, the signals developed at or near extinction for very small retardations are small and difficult to measure and to plot automatically with accurate results.

Modulation techniques have been used but the modulators have made use of crystals. The crystals are fragile and may have undesirable optical characteristics. Their optical quality may be poor and get worse when they heat up in use. The crystals and associated equipment are expensive.

It is therefore an object of this invention to provide an improved photoelastimeter which is simple in construction and operation and is relatively inexpensive.

Another object of this invention is to provide a photoelastimeter which operates automatically and measures very small retardations.

Another object of this invention is to provide an improved birefringent modulator for an automatic photoelastimeter.

BRIEF DESCRIPTION OF THE INVENTION

In practicing this invention, the specimen to be examined is positioned between a polarizer and a quarter wave plate. Monochromatic light passes through the polarizer, the quarter wave plate and the specimen and is detected by a photomultiplier tube. An analyzer and a modulator are also positioned in the optical path. The modulator acts to change the retardation of the light periodically so that the signal developed by the photomultiplier tube is periodic. The quarter wave plate and analyzer function as a compensator. The analyzer is adjusted to cause extinction by means of a servo system which receives the amplified filtered signal from the photomultiplier as the servo control signal.

BRIEF DESCRIPTION OF THE DRAWINGS

The invention is shown in the drawings, of which:
FIG. 4 is a drawing of the modulator of this invention;
FIG. 5 is a drawing showing the mechanical features of the analyzer of FIG. 3.

DETAILED DESCRIPTION OF THE INVENTION

Figure 1:
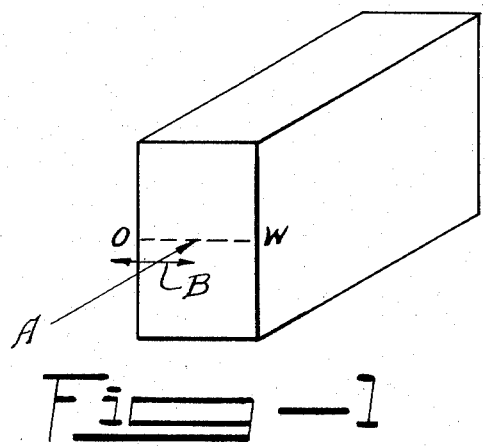
FIG. 1 is a drawing of a sample to be examined for birefringence.

In FIG. 1, there is shown a sample having a strain pattern which is to be measured. This strain may have been induced by irradiation so that the retardation effects of the strain are very small. When several degrees or more rotation of an analyzer of a de Senarmont compensator are required to measure the induced birefringence, the measurements can be made rapidly by visual means. However, when very small retardations are of interest, a more sensitive detector for extinction is required. The system should be automatic in operation, as adjusting the analyzer becomes tedious.

The birefringence of the sample 10 in the direction A is measured as the sample is scanned along line OW in the direction B. The plot of birefringence vs. position of sample 10 is plotted in FIG. 2.

Figure 3:
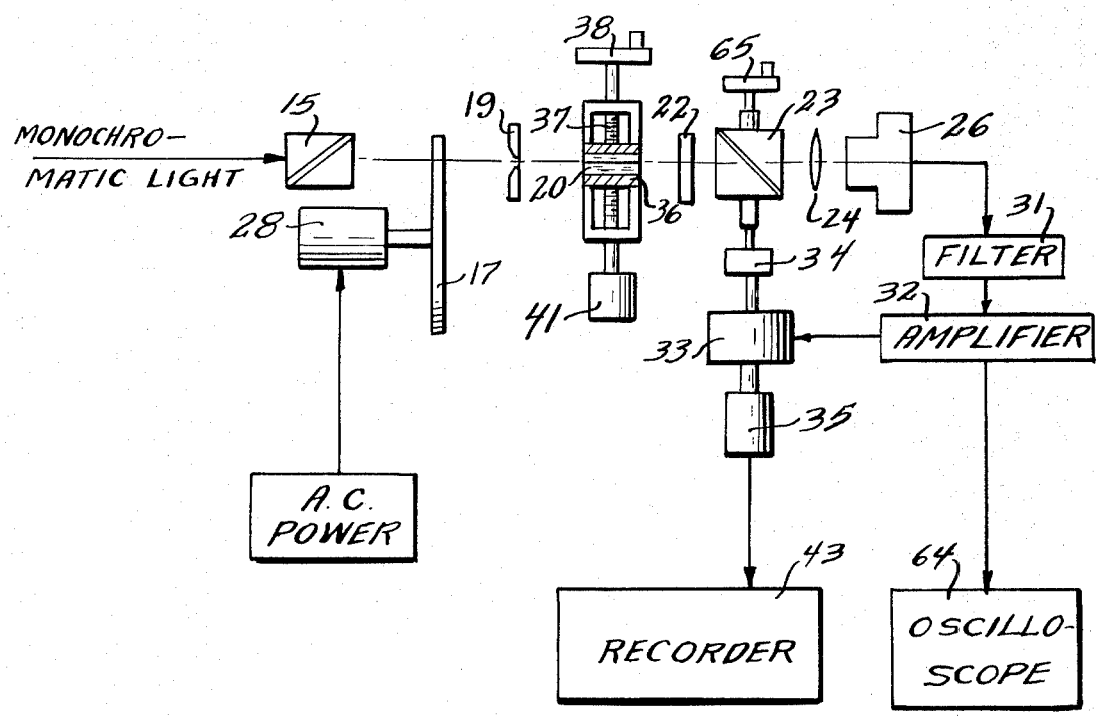
FIG. 3 is a block diagram of the automatic photoelastimeter of this invention.

In FIG. 3, there is shown a schematic view of the apparatus for carrying out the measurements of the very small retardations in the sample. Monochromatic light from a source not shown is directed through polarizer 15, rotating birefringent disk 17 and slit 19 to the sample 20. After passing through the sample 20, the light passes through a de Senarmont compensator including the quarter wave plate 22 and the analyzer 23. The light leaving the analyzer 23 is focused on the photomultiplier 26 by the objective lens 24 where it is converted to an electrical signal. The birefringent disk 17 is rotated by a synchronous motor 28 during the examination to provide birefringent modulation of the light which passes through the system. The modulated light signal is received by the photomultiplier 26 which develops an alternating current signal therefrom.

The retardation due to the modulator may be represented by:

$$\phi = A \sin \omega t$$

Light passing the analyzer near extinction can be approximated by a parabola in displacement $\xi$ from extinction. Thus, with the modulation, the intensity is:

$$I = g(\xi + \phi)^2$$

Two alternating current signals are generated:

$$J_2 = KA^2 \cos 2\omega t$$

If $\xi$ is $+$, $J_1 = 2K\xi A \sin \omega t$
If $\xi$ is $-$, $J_1 = -2K\xi A \sin \omega t$ $J_1$ is a signal which depends linearly on the analyzer 23 displacement from extinction and on the modulator retardation, and $J_1$ changes phase at extinction. Thus $J_1$ can be used to drive a servo system to change the angle of the analyzer to bring about extinction. $J_2$ is a signal, the amplitude of which is independent of the analyzer displacement and which has a frequency twice the modulation frequency.

The output of photomultiplier 26 is filtered by filter 31 and amplified in servo amplifier 32. The amplified servo signal drives servo motor 33 which in turn rotates analyzer 23 through drive mechanism 34.

In operation, the system is balanced to extinction with disk 17 and sample 20 removed from the system. Disk 17 is placed in the system and rotated to modulate the light. Disk 17 can be made from a strained plastic such as a cellulose triacetate which possesses birefringence. As the disk is rotated, the retardation is modulated at twice the rotational frequency to cause the birefringence to oscillate about the extinction point.

With the sample in place, the retardation of the light is changed by an amount $\xi$ away from extinction because of the birefringence of the sample. A $J_1$ signal is generated by the photomultiplier with a phase angle which is dependent upon the direction of displacement away from the extinction point. The $J_1$ signal is filtered in filter 31, amplified in amplifier 32 and applied to servo motor 33. Servo motor 33 is phased to rotate the analyzer 23 by an amount which cancels the birefringence introduced by the sample. Servo motor 33 is coupled to potentiometer or other measuring device 35 and positions the measuring device 35 according to the setting of analyzer 23.

The modulator disk 17 is rotated at a frequency which modulates the light signal so that the frequency of signal $J_1$ is equal to the frequency of the reference signal applied to servo motor 33. For example, motor 28 can be a synchronous motor driven by a 60 Hz. current at 1800 r.p.m. Since there is a reversal of birefringence twice each revolution of the disk, the light would be modulated at 60 Hz. The 60 Hz. current is also applied to the servo motor as the reference current.

Figure 2:
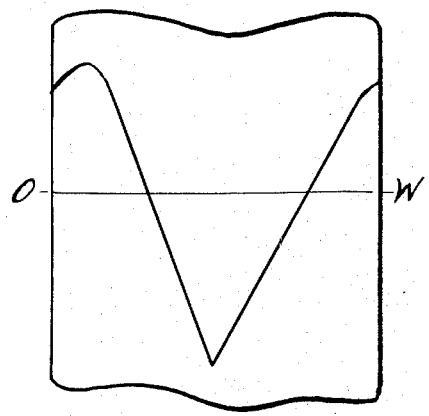
FIG. 2 is a plot of the birefringence of the sample of FIG. 1.

In order to measure the birefringence of the sample, as shown in FIGS. 1 and 2, the sample is positioned on carriage 36. Carriage 36 is movable by turning thread shaft 37 with handle 38. Threaded shaft 37 is also coupled to a potentiometer or other measuring device 41 and moves the position of the measuring device 41 as the sample 20 is moved across the light beam.

The measuring devices 35 and 41 are electrically connected to a commercial recorder 43. Measuring device 41 drives the $x$ axis of recorder 43 and measuring device 35 drives the $y$ axis of recorder 43 in a known manner to record the changes in the position of analyzer 23 as the light beam scans sample 20. Recorder 43 automatically records the plot as shown in FIG. 2. White sample 20 is moved across the light beam by hand, it is obvious that a driving motor could be used for completely automatic scanning of sample 20.

In FIG. 4, there is shown an end view of the rotating birefringent disk 17. The light beam which goes through the disk at right angles to the plane of the drawing is shown at 44. The orientation of the birefringence of the disk 17 is shown by arrows 45 and disk 17 rotates as shown by arrow 46. As the disk 17 rotates, the birefringence presented to the light beam 44 changes twice per revolution. In an example, disk 17 was formed of two sheets of a 7.5 mil cellulose triacetate plastic. Two sheets were used to get the desired amount of birefringence. A 6-degree retardation is satisfactory and gives a modulation large compared to inhomogeneity or biaxiality in the disk 17.

In FIG. 5, there is shown an end view of a realization of a servo driven analyzer of FIG. 3 with identical portions having the same reference numerals. The analyzer 23 is rotated by a lever arm 50 driven by screw 51. Servo motor 33 drives screw 51 through cord drums 54 and 55 and cord 56. Cord drum 54 also includes a clutch mechanism which slips when the cord drums reach the end of their travel. Potentiometer 35 is attached to screw 51 and is driven by the screw so that the position of the potentiometer 35 indicates the position of analyzer 23. In an example of a servo driven analyzer of the above construction, lever arm 50 was chosen so that one-half turn of screw 51 rotated analyzer 23 0.01°.

Figure 6:
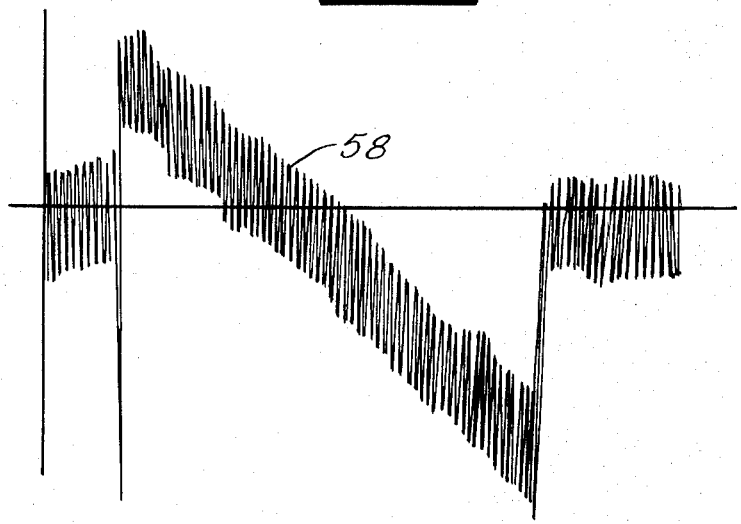
FIG. 6 is a curve showing the output of the automatic photoelastimeter of FIG. 3.

In order to overcome the friction of the servo motor and the associated analyzer mechanism, the servo system can be operated in a natural oscillatory mode. This results in a response curve 58 such as is shown in FIG. 6. The average of the oscillations can be taken as the plot of the null points vs. sample position.

Figure 7:
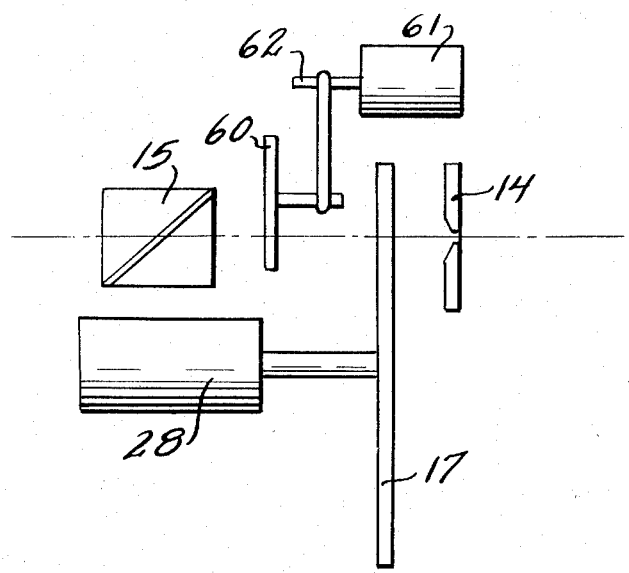
FIG. 7 is a drawing of another embodiment of the automatic photoelastimeter.

In FIG. 7, there is shown another method of overcoming the friction of the servo system by the introduction of an additional birefringent disk 60 to develop a forced oscillation. Portions of FIG. 7 identical with FIG. 3 have the same reference numerals. Birefringent disk 60 is rotated by rotor 61 through belt 62 at a frequency which is not a harmonic of the modulation frequency developed by disk 17. Rotating disk 60 introduces a small amount of birefringent modulation to provide an oscillating control point for the servo system. The oscillating control point acts to reduce the effects of the friction of the servo system without requiring that the system be operated in an oscillatory mode. In an example, disk 60 was made from plate glass and was rotated at approximately 200 r.p.m. The output curve from the system using the modulating disk 60 is similar to the curve in FIG. 6.

Referring again to FIG. 3, there is shown an oscilloscope 64 coupled to amplifier 32. The oscilloscope can be used to display the signal from amplifier 32 for precise manual adjustment of the angle of analyzer 23. A manual control 65 coupled to analyzer 23 permits manual adjustment of analyzer 23 to reduce the signal observed on oscilloscope 64 to a minimum value.

The embodiments of the invention in which an exclusive property or privilege is claimed are defined as follows:

1. An automatic photoelastimeter for measuring birefringence of a sample, including in combiation and in sequence along a beam path, means for generating a beam of polarized light, first modulation means for producing birefringent modulation of said beam of polarized light at a particular modulation frequency, said first modulation means including a first rotating birefringent disk positioned to intercept said beam to develop said birefringent modulation, a quarter wave plate, a rotatable analyzer positioned to receive said modulated light beam and having an adjustable direction of polarization, detector means receiving said modulated light beam from said analyzer and being responsive thereto to develop a signal having a first component at said particular frequency, said sample being positioned in said modulated light beam before said quarter wave plate with a portion of said sample being illuminated by said modulated light beam, and control means coupled to said detector means and said analyzer and responsive to said first signal component to change said direction of polarization of said analyzer automatically to reduce the magnitude of said first signal component to a minimum.

2. The automatic photoelastimeter of claim 1 wherein, said control means includes servo means responsive to said first signal component to change said direction of polarization of said analyzer to reduce said magnitude of said first signal to a minimum, said control means further including first measuring means coupled to said analyzer for developing a first recording signal representative of said analyzer direction of polarization.

3. The automatic photoelastimeter of claim 2 further including, means for traversing said sample across said modulated light beam, second measuring means coupled to said traversing means for developing a second recording signal representative of the position of said sample in said modulated light beam, and recording means coupled to said first and second measuring means and responsive to said first and second recording signals to make a record of said direction of polarization of said analyzer versus said position of said sample in said modulated light beam.

4. The automatic photoelastimeter of claim 3 wherein, said signal developed by said detector means further has a second component having a frequency twice said particular frequency, said control means further including filter means for removing said second component of said signal developed by said detector means.

5. The automatic photoelastimeter of claim 4 wherein, said control means includes amplifier means for amplifying said first signal component whereby said servo means operates in an oscillatory mode.

6. The automatic photoelastimeter of claim 4 further including, second modulating means including a second rotating birefringent disk positioned in the path of said light beam for modulating the same at a frequency which is not a harmonic of said particular modulation frequency.

7. The automatic photoelastimeter of claim 3 wherein, said recording means includes oscilloscope means coupled to said control means for receiving and displaying said first signal component, said analyzer further having manual control means for adjusting the direction of polarization thereof whereby the direction of polarization of said analyzer can be manually changed to reduce said displayed first signal component to a minimum.

References Cited

UNITED STATES PATENTS

| | | | |
|---|---|---|---|
| 1,934,187 | 11/1933 | Glasgow et al. | 356—33 |
| 2,993,402 | 7/1961 | Dunipace et al. | 356—35 |
| 3,183,763 | 5/1965 | Koester | 350—157 |
| 3,446,977 | 5/1969 | Bateson | 250—225 |
| 3,580,681 | 5/1971 | Robert et al. | 356—114 |

RONALD L. WIBERT, Primary Examiner

J. ROTHENBERG, Assistant Examiner

U.S. Cl. X.R.

73—88 A; 250—225; 356—114, 117